(12) United States Patent
DeVeau

(10) Patent No.: US 7,721,837 B1
(45) Date of Patent: May 25, 2010

(54) TETHERED SEPARABLE OCCUPATIONAL SAFETY CAGE FOR TRANSPORTATION VEHICLES

(75) Inventor: David J. DeVeau, 130 Elizabeth Ave., Westfield, MA (US) 01085-1713

(73) Assignee: David J. DeVeau, Westfield, MA (US)

(*) Notice: Subject to any disclaimer, the term of this patent is extended or adjusted under 35 U.S.C. 154(b) by 687 days.

(21) Appl. No.: 10/994,645

(22) Filed: Nov. 23, 2004

Related U.S. Application Data

(60) Provisional application No. 60/579,139, filed on Jun. 14, 2004.

(51) Int. Cl.
*B60R 21/00* (2006.01)
(52) U.S. Cl. .................................... 180/274; 296/35.3
(58) Field of Classification Search ............... 296/35.2, 296/35.3, 190.04, 190.07, 193.03, 187.03; 180/274, 281, 289, 89.13; 280/748
See application file for complete search history.

(56) References Cited

U.S. PATENT DOCUMENTS

| | | | | |
|---|---|---|---|---|
| 2,927,817 A * | 3/1960 | Raup | ............... | 296/35.3 |
| 2,929,637 A * | 3/1960 | Papacosta | ............... | 280/29 |
| 2,959,446 A | 11/1960 | Thompson | | |
| 3,162,479 A * | 12/1964 | Hewitt | ............... | 296/35.2 |
| 3,383,077 A | 5/1968 | Noviello, Jr. | | |
| 3,479,080 A * | 11/1969 | Hilfiker | ............... | 296/35.2 |
| 3,508,783 A * | 4/1970 | Schlanger | ............... | 296/35.2 |
| 3,589,466 A * | 6/1971 | Dudley | ............... | 180/232 |
| 3,695,629 A * | 10/1972 | Schlanger | ............... | 280/730.1 |
| 3,743,347 A * | 7/1973 | Shaw | ............... | 296/35.2 |
| 3,831,998 A * | 8/1974 | Hewitt | ............... | 296/35.2 |
| 3,837,422 A * | 9/1974 | Schlanger | ............... | 280/734 |
| 4,826,209 A * | 5/1989 | Farris | ............... | 280/784 |
| 5,251,911 A * | 10/1993 | Blake | ............... | 296/35.1 |
| 5,738,378 A * | 4/1998 | Yazejian | ............... | 280/784 |
| 5,772,245 A | 6/1998 | Muhlhausen | | |
| 5,915,775 A * | 6/1999 | Martin et al. | ............... | 296/35.2 |
| 6,464,275 B2 * | 10/2002 | Laurent et al. | ............... | 296/35.2 |
| 6,786,534 B1 * | 9/2004 | Peng | ............... | 296/187.08 |
| 2001/0017477 A1 * | 8/2001 | Rajasingham | ............... | 296/189 |
| 2003/0127837 A1 * | 7/2003 | Rajasingham | ............... | 280/730.1 |
| 2005/0077746 A1 * | 4/2005 | Rajasingham | ............... | 296/26.08 |

FOREIGN PATENT DOCUMENTS

DE    4102526 A1 *  7/1992

* cited by examiner

*Primary Examiner*—Paul N. Dickson
*Assistant Examiner*—Timothy Wilhelm

(57) ABSTRACT

An occupant safety cage (1, FIG. 1) for a transportation vehicle (e.g., a car, truck, etc.) that is separable from but tethered to the vehicle's mainframe and/or remaining portions of the vehicle, is attached by means of stretch and deform cushion mounts (2, FIG. 2) and/or stretch and tear strap mounts (3, FIG. 3) and/or extendable tether cable mounts (4, FIG. 4) and allows the occupant safety cage (1) to separate in any and all relative directions and remains tethered at a safe distance by a controlled design intent of said mounts from the sacrificial areas of the vehicle in stages of implementation (see FIGS. 5 and 6) as resulting from the forces and/or inertia level(s) from thereof as caused by a high-speed collision at the front and/or rear and/or sides of the vehicle as shown in the drawings (see FIGS. 7A and 7B).

9 Claims, 7 Drawing Sheets

SIDE VIEW

FRONT VIEW

TETHERED SEPARABLE OCCUPATIONAL SAFETY CAGE FOR TRANSPORTATION VEHICLES

RELATED APPLICATION

This application has the priority benefit of U.S. Provisional Patent Application Ser. No. 60/579,139 filed Jun. 14, 2004, entitled "Tethered Separable, Occupant Safety Cage for Transportation Vehicles," whose disclosure is incorporated herein by reference.

TECHNICAL FIELD

The present invention relates to transportation vehicles, for example, cars, trucks, etc., and more particularly to an occupant safety cage therefore which is separable from but tethered to the basic vehicle frame for protection of the occupants during, for example, a high-speed collision.

BACKGROUND OF THE INVENTION

The exemplary embodiment of the present invention, herein embodied and titled as the "Tethered Separable Occupant Safety Cage For Transportation Vehicles," is intended to offer a single solution to the many problems addressed by the NHTSA, (know as the National Highway Traffic Safety Administration) but not limited to its goals to "Improve The Protection Of Occupants" and to "Address Incompatibility Between Passenger Cars And Light Trucks" and to "Make Larger Trucks Safer" and further is a solution to the problem as undefined to date by the NHTSA to "Address The Incompatibility Between All Sizes Of Passenger Cars and All Sizes Of Trucks."

Existing safety technologies and vehicle construction designs, as known by common knowledge and manufactured for public use to date, fail to protect the occupants when the vehicle's passenger and driver compartment is crushed from the resulting forces of a high-speed collision with vehicles of compatible and incompatible sizes or with other fixed or movable obstacles.

Further prior art of like intent that are of movable passenger compartments also fail to demonstrate any solution(s) for movement and or separation of the passenger compartment in all the related directions of possible impact(s) from a collision that are without elements that can bind and/or constrict full movement in any and all direction(s) from impact of for example from a high speed collision.

Currently, it is believed that there are no known inventions or other prior art to encompass the mechanical design intentions of the current invention as herein exemplified and more generally defined.

As in prior art of U.S. Pat. No. 4,826,209 to Farris, U.S. Pat. No. 5,738,378 to Yazejian the exemplary embodiment hereof does not depend on any type of separable and/or splitting frame member in which the engine and/or transmission and/or axel is dependent upon to separate and/or split from the occupant compartment that is still attached to the remainder of the vehicle to include frame and/or axel(s). The embodiment hereof and to like art, is of a completely separable occupant compartment safety cage.

As in prior art of U.S. Pat. No. 2,929,637 to Papacosta, U.S. Pat. No. 3,383,077 to Noviello, the exemplary embodiment hereof does not depend on any driver reaction, such as hitting the brake and/or other pedal and/or device, to initiate and/or activate separation movement of the passenger compartment.

As in prior art of U.S. Pat. No. 2,927,817 to Raup, U.S. Pat. No. 2,929,637 to Papacosta, U.S. Pat. No. 2,959,446 to Thompson, U.S. Pat. No. 3,162,479 to Hewitt, U.S. Pat. No. 3,383,077 to Noviello, U.S. Pat. No. 3,479,080 to Hilfiker, U.S. Pat. No. 3,743,347 to Shaw, U.S. Pat. No. 3,831,998 to Hewitt, U.S. Pat. Nos. 3,695,629 and 3,837,422 to Schlanger, U.S. Pat. No. 5,251,911 to Blake, U.S. Pat. No. 6,464,275 to Laurent, the exemplary embodiment hereof does not depend on any electrical motors or mechanical ratchets, wedges, gears, springs, pulleys or hydraulic, pneumatic or pyrotechnic devices to initiate and/or activate and/or control separation movement of the occupant compartment.

As in the prior art of U.S. Pat. No. 2,927,817 to Raup, U.S. Pat. No. 2,959,446 to Thompson, U.S. Pat. No. 3,162,479 to Hewitt, U.S. Pat. No. 3,383,077 to Noviello, U.S. Pat. No. 3,479,080 to Hilfiker, U.S. Pat. Nos. 3,508,783, 3,695,629, 3,837,422, all to Schlanger, U.S. Pat. No. 3,589,466 to Dudley, U.S. Pat. No. 3,743,347 to Shaw, U.S. Pat. No. 3,831,998 to Hewitt, U.S. Pat. No. 5,251,911 to Blake, U.S. Pat. No. 5,772,245 to Muhihausen, U.S. Pat. No. 5,915,775 to Martin, U.S. Pat. No. 6,464,275 to Laurent, U.S. Pat. No. 6,786,534 to Peng, the exemplary embodiment hereof does not depend any mechanical tracks, rails or slotted mounting points or flexible cord wrap and/or any like mechanisms to guide and/or limit the direction(s) of separation movement of the passenger compartment.

As in the prior art of U.S. Pat. No. 5,251,911 to Blake the exemplary embodiment hereof does not depend on metal like rod(s) and or mount(s) of design intent to require fragility and/or breakage to allow separation movement of the occupant compartment. The exemplary embodiment hereof uses anchor like mount(s) each on the occupant compartment and the remaining vehicle to interconnecting rubber pad like cushion mount(s) that stretch and/or deform to allow directionally unrestricted separation of the occupant compartment.

As in prior art of U.S. Pat. No. 5,772,246 to Muhlhausen, the exemplary embodiment hereof does not depend fastening means which are dimensioned for absorbing a set force peak and which, when the force peak is exceeded, either stretch or even rupture and/or are of pad like designs of intent to stretch or rupture at a set force in a short distance as known by common practice of mounting, for example, engines and transmissions and/or is of design intent to not allow a separation movement until set force is exceeded and/or to not allow a gradual separation movement of the occupant compartment. The exemplary embodiment hereof uses anchor like mounts each affixed on the occupant compartment and the remaining vehicle to interconnecting rubber strap like mount(s) that stretch gradually before tearing and/or rupturing to allow directionally unrestricted separation of the occupant compartment.

As in prior art of U.S. Pat. No. 6,786,534 to Peng the exemplary embodiment hereof does not depend on lateral displacement sufficient to displace a cross member that transforms the tensile member comprises of a metallic cable from a un-tensioned state to a tensioned state and/or to arrest said lateral movement of the passenger compartment and/or is of design intent to limiting movement and/or to limiting distance on a lateral plane and/or is of a design intent to not allow a completely separable movement in any direction(s) of a tethered occupant compartment. The exemplary embodiment hereof uses anchor like mount(s) connecting to spooled cable(s) each on the occupant compartment and the remaining vehicle to allow directionally unrestricted tethered separation of the occupant compartment.

Thus it is believed that the present invention hereof represents innovative advancements in the prior arts and a valuable contribution to the useful arts.

SUMMARY OF THE INVENTION

As previously noted, the present invention is directed to a separable but tethered passenger safety cage for protecting occupant(s) being carried by a transportation vehicle in the event of a high-speed collision. The various connections between the safety cage and the vehicle's mainframe allow the safety cage to be expelled from the vehicle mainframe and other sacrificial vehicle components in order to protect the driver and passengers in the event of a high-speed collision.

The exemplary embodiment of the present invention is designed to expel the safety cage from the vehicle's mainframe without any type of mechanical mechanisms for example gears, ratchets, springs, pulleys, hydraulics, or pneumatics to force initiation and/or assist activation of the separation or use any type of shear pin or mounting pad or any like connections that require fragility to allow breakage or rupture before allowing any separation to proceed or any type of mechanical tracks, rails, slotted mounts, cables and pulleys or any like mechanisms to guide and hence limit the movement of the passenger compartment in any direction forward and rearward and upward directions and/or side to side directions independently or in any combinations of all these movements.

The exemplary embodiment of the present invention is designed to expel the safety cage from the vehicle's mainframe in any direction and/or combination of directions with no restrictions of movement but of limited distance by using a non-directionally restraining tether(s) in order to keep the safety cage from not being fully expelled into other dangers such as oncoming traffic.

The first primary connections between the safety cage and the vehicle's mainframe elements, commonly called body mounts, use a rubber like stretch and deform connection between the cage and the mainframe which are the first elements to separate in the initial stages of a high-speed collision (e.g., impact forces equal to approximately 35 miles per hour), preferably being located on the underside at the front and rear of the safety cage to the vehicle's mainframe.

The second primary connections between the safety cage and the vehicle's mainframe elements use a rubber strap like stretch and gradually tear apart connection between the cage and the mainframe which are the second elements to separate in the later stages of a high-speed collision (e.g., impact forces equal to approximately 45 miles per hour), preferably mounted to the front and rear of the lower sides of the safety cage to the vehicle's mainframe that further with their own simplified design as an intermediate connection(s) offers a design ability of the body mount(s) and the tether mount(s) to also be of simplified design.

The main primary connections between the safety cage and the vehicle's mainframe elements are the extendable tethered cable like mounts that allow separation in any one or any combination of directions within a determined safe distance, preferably located front and rear at the mid point inner corners of the safety cage to the mainframe that further create an element of control by offering resistance that slows the inertia caused momentum throughout the events of a high-speed collision.

The exemplary embodiment of this invention offers design options that when combined and/or used separately to improve other designs of similar intent allows for the separation of the passenger safety cage from the mainframe and other sacrificial elements of a transportation vehicle without any directional restrictions for example in keeping with passenger safety by separation of the passenger safety cage from the mainframe as a result from any type of high-speed collision to include but not limited to a collision between vehicle's, stationary or movable objects.

The concept of a separable driver and occupant's compartment, safety cage, is not unique to this and/or any one previous art, however the exemplary embodiment of the present invention is designed to expel the passenger safety cage without the use of any mechanical activation to initiate the start of separation, without the use of any connecting mounts that require shearing or breakage or rupture before separation can proceed, without any tracks or guides that limit the movement of the passenger compartment and further without any retention elements that restrict separation in any direction or combinations of directions forward and rearward and upward directions or side to side directions independently or in any combinations of all these directional movements of the safety cage from the mainframe and/or other sacrificial elements of the transportation vehicle and still keep the safety cage tethered to mainframe and other sacrificial elements without any directional restraint(s) in the event of a high-speed collision and hence it should become obvious to one or ordinary skills as to exemplary embodied of this present invention.

This invention herein defined as titled the "Tethered Separable Occupant Safety Cage For Transportation Vehicles" can also be improved with such elements, not demonstrated nor directly part of this invention, as with the implementation of enclosing the compartment's structural elements in a blanket of bulletproof material such as, for example, "Kevlar"® and or a material such as a fire proof ceramic fiber and/or floatation devices that can also be implemented with but not limited to sensors that measure the time differentials between implementation and failure of these related invention's devices, gravity forces and even temperatures in conjunction with additional devices that will disengage any of the remaining invention's connecting elements and or tethers so that the separable occupant safety cage can be manually pulled away from burning transportation vehicles and or will completely separate by other means from the rest of the vehicle in the event of fire or water submersion or extreme impact forces beyond any design normality or even in access of measurable limits.

Finally when this invention is implemented into a vehicle in combination with existing safety technologies, not demonstrated nor directly part of this invention, such as seat belt restraints and passenger compartment air bags and shock absorbing bumpers and non-passenger compartment sacrificial areas of the vehicle known as crush zones, it becomes easy to imagine as the vehicles' sacrificial areas are bending and crushing under the forces of impact during the events of a high-speed collision and slowing the forces of motion, how the moments of inertia in any direction implement the basic design function of this tethered separable occupant safety cage for transportation vehicles in conjunction with the related functional elements and/or with like designs separately or in combination for similar intent that will enable this present invention of a controlled separation of the driver and passenger(s) compartment from the motor vehicle and hence to be the solution to most of the NHTSA requirements for passenger safety in the present and even well into the future.

DESCRIPTION OF THE DRAWINGS

For a further understanding of the nature and objects of the present invention, reference should be had to the following detailed description, taken in conjunction with the accompanying drawings, wherein.

DESCRIPTION OF THE INVENTION

Figure 1:
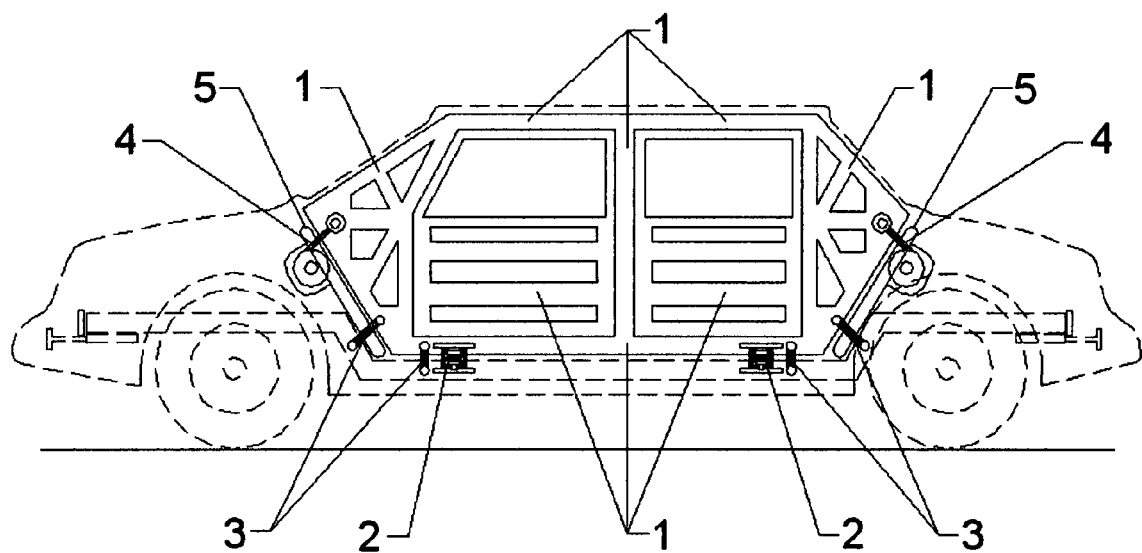
FIG. 1 is a side view of the exemplary, currently preferred embodiment of the tethered separable occupant safety cage for transportation vehicles and its exemplary, primary related components as implemented within an example of a typical automobile's basic components as illustrated with broken lines.

The preferred embodiment of this invention as herein titled the "Tethered Separable Occupant Safety Cage for Transportation Vehicles" is defined by the explanations and illustrations shown in the accompanying narratives and drawings that describe the functions and implementations of this present invention as follows:

Listing of Reference Numbers Used in Drawings (1) tethered separable occupant safety cage for transportation vehicles
(2) stretch and deform cushion mount
(3) stretch and tear strap mount
(4) extendable tether cable mount
(5) safety cage shield
(6) stretch and deform cushion mount frame retaining anchor
(7) stretch and deform cushion mount safety cage disengaging anchor
(8) stretch and tear strap mount safety cage retaining anchor
(9) stretch and tear strap mount frame retaining anchor
(10) extendable tether mount safety cage retaining anchor
(11) extendable tether cable mount spindle retainer
(12) extendable tether cable mount spindle
(13) extendable tether cable mount spindle cover The transportation vehicle's design is basically the same as existing technologies but is constructed with one major difference—as in like art the driver and occupant's compartment is designed to expel from the vehicle in the event of a high-speed collision. In such a collision, the exemplary embodiment of the present invention allows the tethered separable occupant safety cage 1 for transportation vehicles to separate without any directional restraints in stages forward, rearward, sideward, upward, and/or in any combination thereof from the transportation vehicle with the implementation of the design elements designated as the stretch and deform cushion mount(s) 2, stretch and tear strap mount(s) 3, the extendable tether cable mount(s) 4 and the safety cage shield(s) 5 as shown in FIG. 1 and the following figures.

Figure 2:
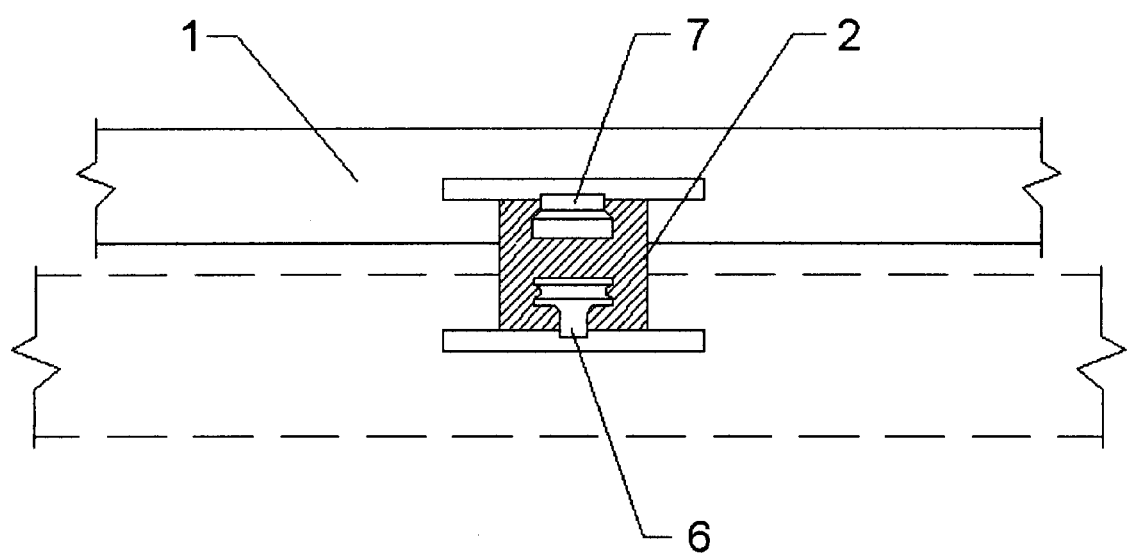
FIG. 2 is a detailed view of an exemplary stretch and deform cushion mount (2) and related components as assembled to a partial section of the embodiment of FIG. 1.
Figure 5:
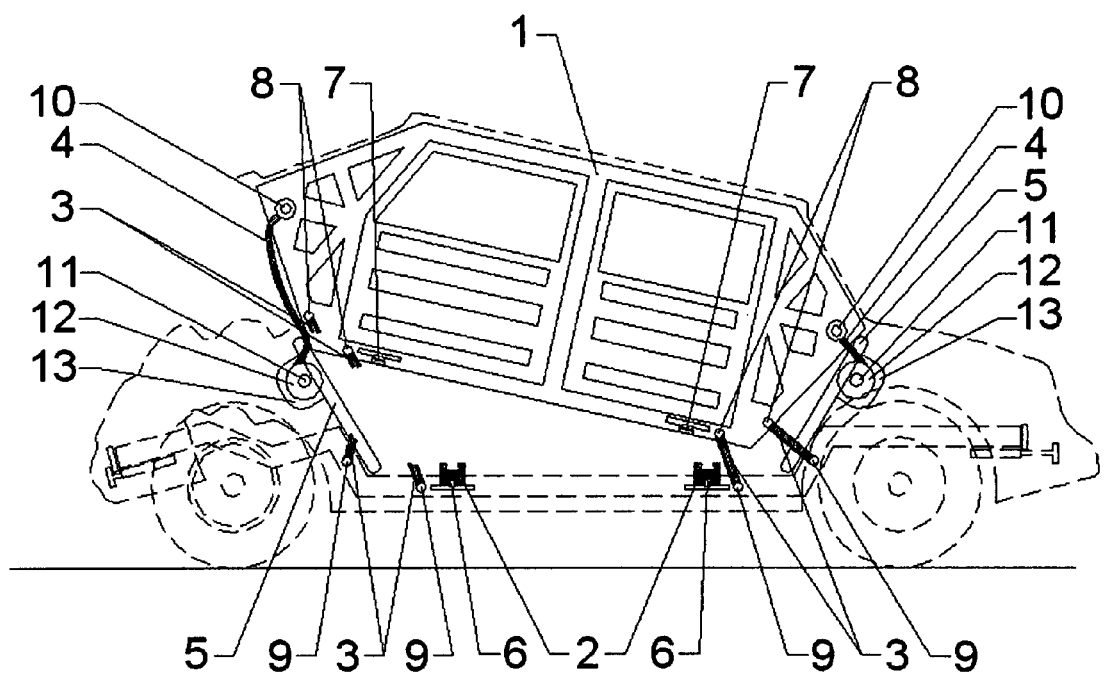
FIG. 5 is a side view of the tethered separable occupant safety cage for transportation vehicles and all related components of the invention as shown assembled to a vehicle frame with body components as illustrated with broken lines illustrating an example of this embodiment of the invention after implementation caused by the event of a high speed collision at the front of the transportation vehicle with resulting damage and as shown has separated from all of the stretch and deform cushion mounts, has separated from the frontally located stretch and tear strap mounts and is still tethered by the rearward located stretch and tear strap mounts and all of the extendable tether cable mounts at the front and rear of the vehicle.

In the initial event of a high-speed collision, the tethered separable occupant safety cage 1 will begin to separate from the transportation vehicle frame and components as shown in FIG. 5 by means of the stretch and deform cushion mount(s) 2 individually detailed in FIG. 2 or of like construction that is comprised of, for example, a rubber polymer pad-like device designed to cushion vibration during normal operation and joined by the frame retaining anchor 6 and the safety cage disengaging anchor 7 that are comprised of, for example metal, and when combined are designed to separate by means of the forces from the initial moments of impact in the event of a high-speed collision (e.g., impact forces equal to approximately 35 miles per hour).

Figure 3:
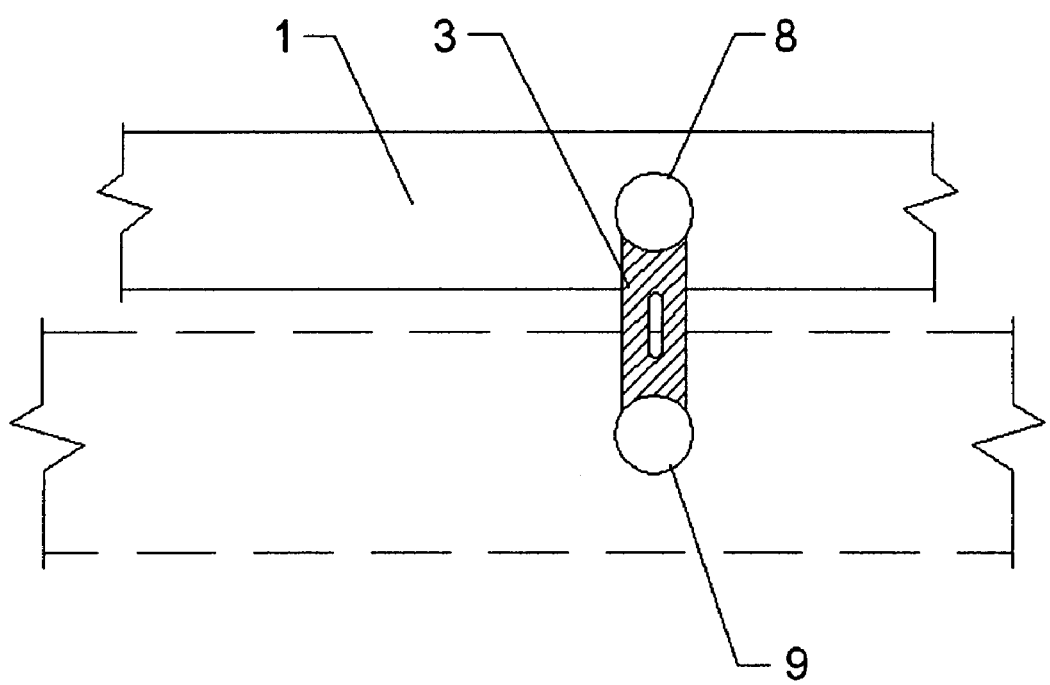
FIG. 3 is a detailed view of an exemplary stretch and tear strap mount (3) and related components as assembled to a partial section of the embodiment of FIG. 1.

Further during the initial impact stages of impact as shown in FIG. 5 the separation of the occupant safety cage from the transportation vehicle frame and components is limited in movement by the stretching action of the stretch and tear strap mount 3 as detailed in FIG. 3 or of like construction that is comprised of, for example, a rubber polymer in an elastic band-like design that is joined by the safety cage retaining anchor 8 and the frame retaining anchor 9 that are comprised of, for example, metal, and when combined are designed for lateral failure (that is, structural destruction by exceeding the stretching limits of it's design) from the time of the initial separation of the stretch and deform cushion mounts 2 and up to its intended design limit by means of the forces from the later moments of impact in the event of a high-speed collision (e.g., impact forces equal to approximately 45 miles per hour).

Figure 4:
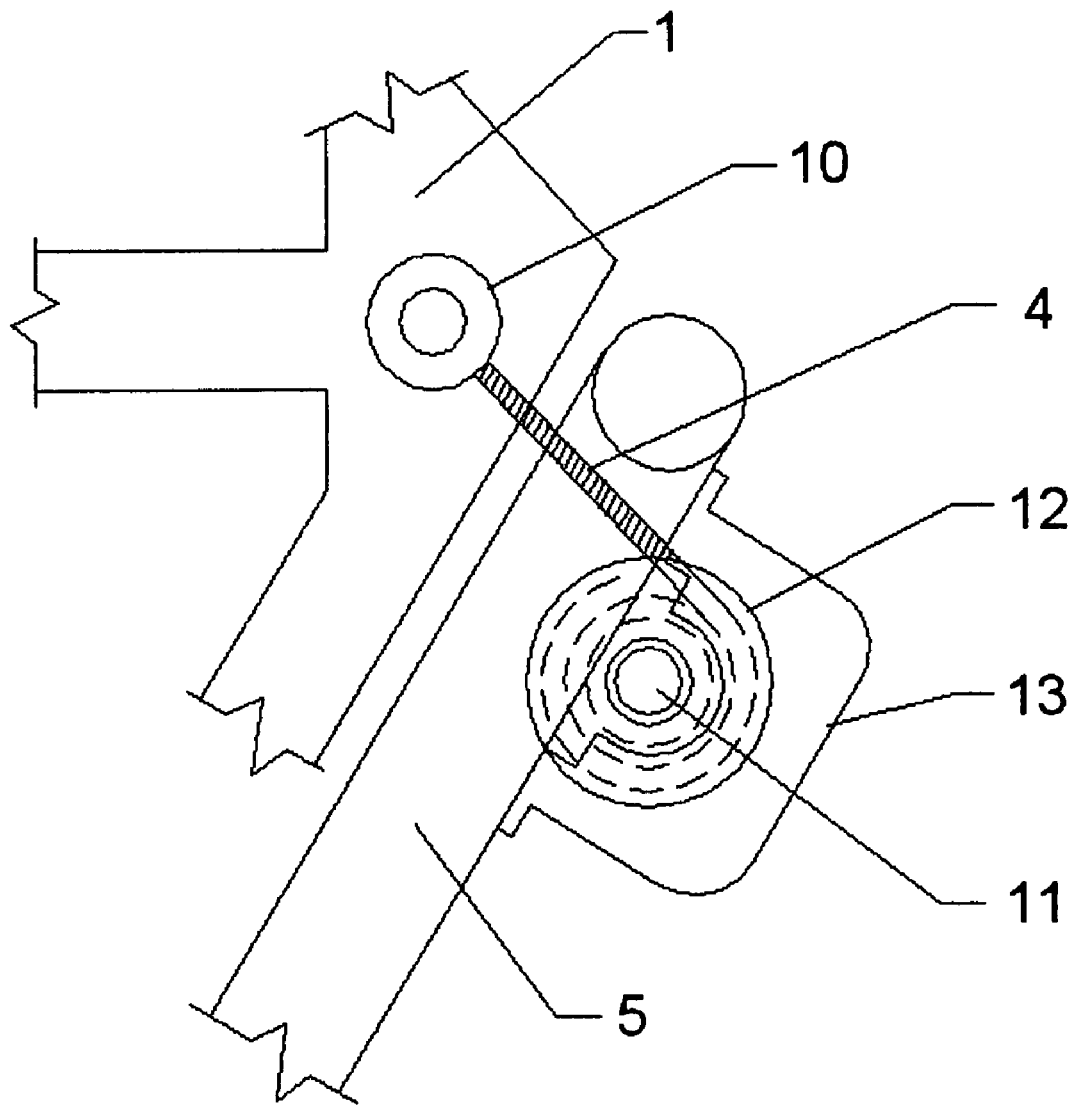
FIG. 4 is a detailed view of an exemplary extendable tether cable mount (4) and related components as assembled to a partial section of the embodiment of FIG. 1.

In coordination with the elements as defined above or with the combination of like designs in the initial impact and further throughout the full range of forces implemented by the collision impact, the extendable tether cable mount 4 as detailed in FIG. 4 are the controlling elements that incorporates, for example, a clutched tether mount spindle retainer 11, that slows the resolutions of the tether cable mount spindle 12, that is further protected by the extendable tether cable mount spindle cover 13, that expels the tether cable 4, with an element of resistance that is attached to the vehicle's frame by means of the safety cage shield 5 and to the occupant safety cage by means of the extendable tether mount safety cage retaining anchor 10 that are all comprised of, for example, metal and/or high strength composite materials, etc.

Figure 6:
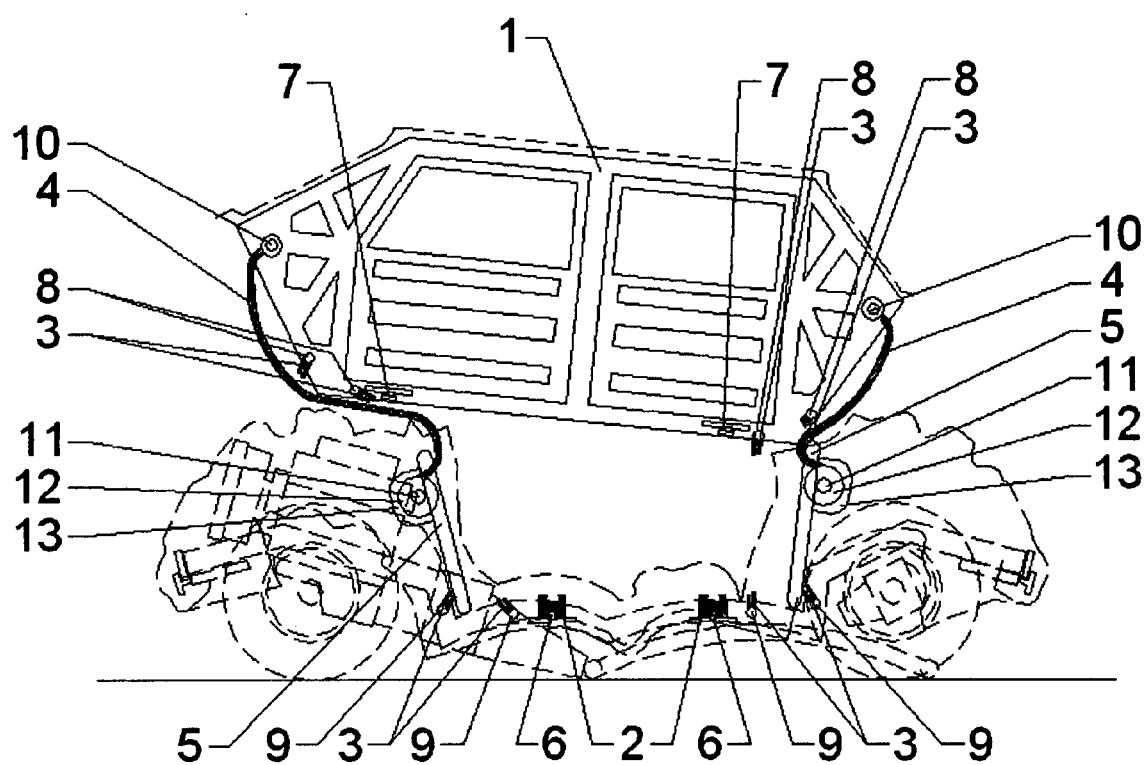
FIG. 6 is a side view of the tethered separable occupant safety cage for transportation vehicles and all related components of the invention as shown assembled to a vehicle frame with body components as illustrated with broken lines illustrating an example of this embodiment of the invention after implementation caused by the event of a high speed collision at the front and rear of the transportation vehicle with resulting damage and as shown has separated from all of the stretch and deform cushion mounts and all of the stretch and tear strap mounts and is still tethered by all of the extendible tether cable mount(s) at the front and rear of the vehicle.

Under the conditions of a high-speed collision event the tether mounts 4 will hold the separable occupant safety cage 1 within a determined distance to the vehicle's frame and other components as shown in FIG. 6 and further in any direction or combination of directions to prevent the safety cage from being expelled into other dangers, such as on coming traffic, thus moving the occupants out of harm's way during the collapse of the vehicle and its sacrificial areas throughout the event of a high-speed collision.

Figure 7A:
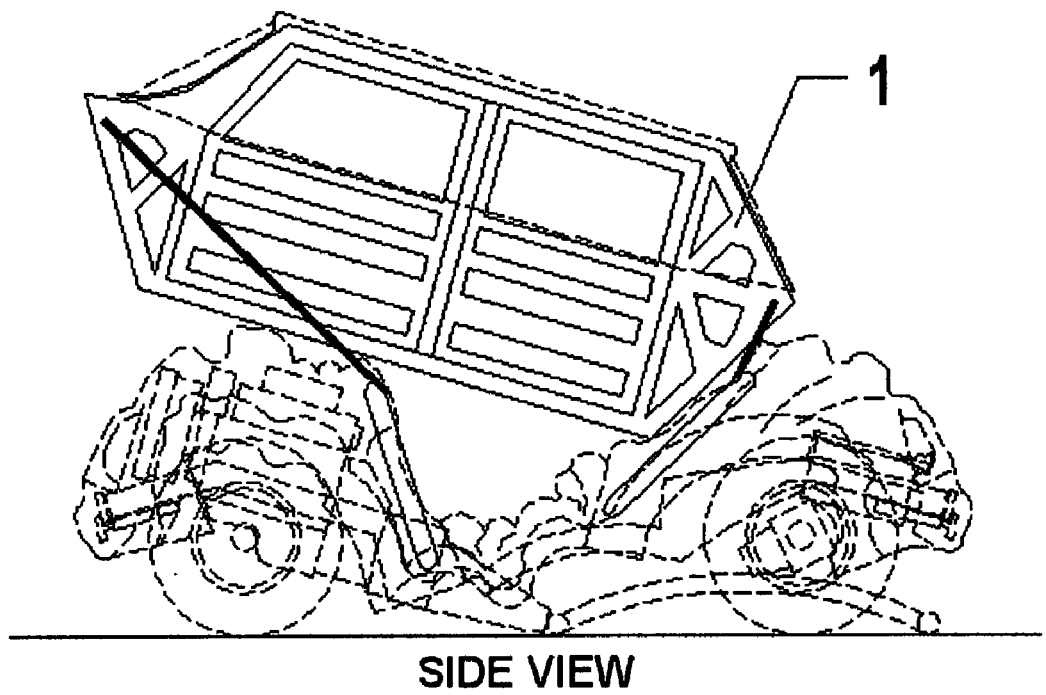
FIGS. 7A and 7B are simplified side and front views, respectively, of the tethered separable occupant safety cage for transportation vehicles with an example of a typical automobile's basic components as illustrated with broken lines after an exemplary front and rear and a side high-speed collision.
Figure 7B:
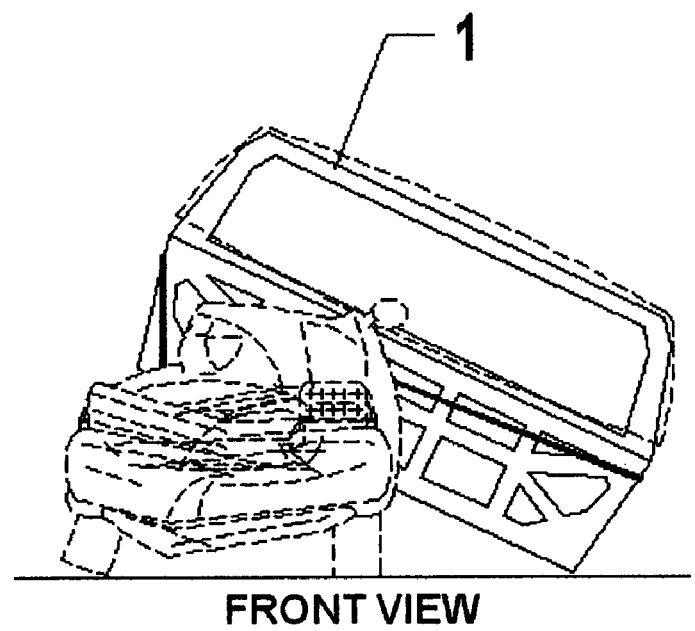

As shown in FIGS. 7A and 7B after the events of a high-speed collision, rescue personnel will have easier access to the tethered separable occupant safety cage 1 in order to, for example, recover and assist the crash survivors.

It should be understood that the foregoing dimensions, materials and collision events, etc. are merely exemplary and many other variations are possible within the teachings of the present invention.

Thus, it is further noted that the embodiment illustrated and described herein in detail for exemplary purposes are of course subject to variations in structure, design, application and methodology. Because varying and different embodiments may be made within the scope of the inventive concept(s) herein taught and because modifications may be made in the exemplary embodiment herein detailed in accordance with the descriptive requirements of the law, it is to be understood that the details herein generally are interpreted as illustrative and not in a limiting sense.

What is claimed is:

1. A safety arrangement for a motor vehicle comprising:
A vehicle frame;
a passenger compartment safety cage;
a rubber cushion mount designed so as to break by means of the inertia forces from the initial moments of impact in the event of a high-speed collision;
a rubber strap mount designed so as to break by means of the inertia forces from the initial moments of impact in the event of a high-speed collision;
and a cable tether;
wherein the safety cage is attached to the vehicle frame by the rubber cushion mount, the rubber strap mount, and the cable tether such that, in the event of a high-speed collision, said rubber cushion mount and said rubber strap mount break to allow for separation of the safety cage away from the vehicle frame in forward, rearward, upward, and sideward directions and said cable tether extends between said safety cage and said vehicle frame in any of said directions.

2. A safety arrangement for a motor vehicle according to claim 1, wherein said rubber cushion mount is joined to both of said safety cage and said vehicle frame by an anchor mount.

3. A safety arrangement for a motor vehicle according to claim 2, wherein said anchor mount is affixed to the safety cage and to the vehicle frame in such a way so as to separate from said rubber cushion mount by means of the inertia forces resulting from the initial moments of impact in the event of a high-speed collision.

4. A safety arrangement for a motor vehicle according to claim 1, wherein said rubber strap mount is joined to both of said safety cage and said vehicle frame by an anchor mount.

5. A safety arrangement for a motor vehicle according to claim 4, wherein said anchor mount is affixed to the safety cage and to the vehicle frame in such a way so as to separate from said rubber cushion mount by means of the inertia forces resulting from the initial moments of impact in the event of a high-speed collision.

6. A safety arrangement for a motor vehicle according to claim 1, wherein said cable tether is joined to the vehicle frame by a spindle mount and to the safety cage by an anchor mount.

7. A safety arrangement for a motor vehicle according to claim 6, wherein said spindle mount spools said cable tether to allow the safety cage to separate from but remain tethered to the vehicle frame throughout impact in the event of a high-speed collision.

8. A safety arrangement for a motor vehicle according to claim 6, wherein said anchor mount joins the cable tether to the safety cage such that the safety cage to extracts said cable tether from said spindle mount to allow the safety cage to separate from but remain tethered to the vehicle throughout impact in the event of a high-speed collision.

9. A safety arrangement for a motor vehicle according to claim 1, wherein said cushion mount, said strap mount, and said cable tether are designed to allow control of separation and tethered extension distance during impact in the event of a high-speed collision.

* * * * *

UNITED STATES PATENT AND TRADEMARK OFFICE
CERTIFICATE OF CORRECTION

PATENT NO. : 7,721,837 B1 Page 1 of 1
APPLICATION NO. : 10/994645
DATED : May 25, 2010
INVENTOR(S) : David J. DeVeau It is certified that error appears in the above-identified patent and that said Letters Patent is hereby corrected as shown below:

DESCRIPTION OF THE INVENTION

Column 6, Line 62:
... that slows the ~~resolutions~~ revolutions of the tether cable mount spindle ....

CLAIMS

Column 8, Line 21:
... ~~from~~ said rubber ~~cushion~~ strap mount by means of the inertia forces ...

Column 8, Line 35:
... the safety cage such that the safety cage ~~to~~ extracts said cable ...

Signed and Sealed this

Twenty-third Day of November, 2010

David J. Kappos
*Director of the United States Patent and Trademark Office*